United States Patent
Giebmanns

(10) Patent No.: US 7,143,489 B1
(45) Date of Patent: Dec. 5, 2006

(54) MULTIPLE STATION TOOLING MACHINE FOR MANUFACTURING DRILL BITS AND OTHER SPIRALLY GROOVED WORKPIECES

(76) Inventor: Karl-Heinz Giebmanns, 10 Cedar dale Ct., Palm Coast, FL (US) 32137

( * ) Notice: Subject to any disclaimer, the term of this patent is extended or adjusted under 35 U.S.C. 154(b) by 0 days.

(21) Appl. No.: 09/590,903

(22) Filed: Jun. 9, 2000

(30) Foreign Application Priority Data

Jun. 11, 1999 (DE) .......................... 199 26 668

(51) Int. Cl.
*B23Q 5/04* (2006.01)
*B23C 3/32* (2006.01)
*B24B 19/04* (2006.01)
*B23P 23/00* (2006.01)

(52) U.S. Cl. ................. 29/38 A; 409/158; 409/167; 409/168; 451/375; 451/401

(58) Field of Classification Search ........... 29/38 A, 29/38 B, 563, 564; 451/226, 362, 403, 375, 451/401, 5, 48, 149; 409/158, 162, 165, 167, 409/168

See application file for complete search history.

(56) References Cited

U.S. PATENT DOCUMENTS

| | | | | |
|---|---|---|---|---|
| 3,792,633 A | * | 2/1974 | Filipiev et al. | 29/38 A |
| 4,007,521 A | * | 2/1977 | Keusch | 29/38 C |
| 4,241,639 A | * | 12/1980 | Baer | 29/563 UX |
| 4,461,121 A | * | 7/1984 | Motzer et al. | 451/226 X |
| 4,565,475 A | * | 1/1986 | Sygnator | 409/192 |
| 5,042,126 A | * | 8/1991 | Simonin | 29/38 B |
| 5,832,590 A | * | 11/1998 | Wuerthner | 29/563 |

FOREIGN PATENT DOCUMENTS

| | | | | |
|---|---|---|---|---|
| EP | 0054250 | * | 12/1981 | 29/38 B |
| JP | 4-372345 | * | 12/1992 | 451/5 X |

* cited by examiner

*Primary Examiner*—William Briggs
(74) *Attorney, Agent, or Firm*—R W Becker & Associates; R. W. Becker

(57) ABSTRACT

The present invention provides a multiple station tooling machine for the production of spirally grooved products and includes a base plate, a plurality of work stations distributed around the base plate and operable to effect selected tooling operations on work pieces, a support stand coupled to the base plate and supporting a support plate, and a turntable disposed above the support plate, the turntable being iteratively angularly movable. The multiple station tooling machine also includes a plurality of workpiece retaining elements and an actuating assembly including drive motors mounted on the support plate for moving the workpiece retaining elements to and between selected orientations. A plurality of generally vertical shafts each has a respective workpiece retaining element secured to one end thereof. The generally vertical shafts are releasably couplable to the actuating assembly such that the actuating assembly can effect rotational and axial movement of the generally vertical shafts to thereby move the workpiece retaining elements secured to the generally vertical shafts into selected orientations. Also, the generally vertical shafts are releasably securable to the turntable.

15 Claims, 2 Drawing Sheets

MULTIPLE STATION TOOLING MACHINE FOR MANUFACTURING DRILL BITS AND OTHER SPIRALLY GROOVED WORKPIECES

BACKGROUND OF THE INVENTION

The present invention relates to a multiple station tooling machine for manufacturing drill bits and other spirally grooved workpieces.

DE 30 47 599 A1 discloses a method and apparatus for disposing a hard metal plate to the head of a spirally threaded drill bit. The apparatus comprises a guide element which is iteratively movable to various work stations, the guide element having receiving recesses in which the spirally threaded drill bits are disposable in vertical orientations, a height adjustable support for receiving the shaft ends of the drill bits supported on the guide element, a retaining element for yieldably engaging the shaft of a supported drill bit, a turning element which is operable to engage a slot of the drill bit head in predetermined angular positions and to counter the drill bit engagement operation of the retaining element and which is stoppable at predetermined angular positions, a classification drum for oriented feeding of hard metal plates along a feed rail, an insertion element for inserting into the slot on the drill bit head a hard metal plate which is disposed in a feed ready disposition on a feed component of the feed rail, and an optional brazing station, whereby there is arranged the disposition of a constant axis, prismatic retaining chuck or three lug chuck and a notch element oriented for iteratively engaging the radially inner edge of the drill bit, preferably on both sides.

The apparatus disclosed in DE 30 47 599 A1 permits the execution of an operation for disposing a hard metal plate in a slot on the head of a spirally threaded drill bit which involves disposing the slot region of the vertically supported drill bit at a constant height, yieldably engaging the shaft of the supported drill bit, orienting the slot of the drill bit at a predetermined angular disposition, setting the hard metal plate into the slot relative to an extension thereof at the head of the spirally threaded drill bit, and, optionally, securing the hard metal plate in its disposition in the slot by means of a brazing mixture, whereby the drill bit is retained, independent of the magnitude of its diameter, in a vertical position and, following the disposition of the hard metal plate into the slot of the drill bit head at the radial inner edge of the slot, can be grooved by an element firmly disposed against the hard metal plate in the slot.

The creation of the spiral groove in a spiral threaded drill bit, the grinding or cutting of the tip of the drill bit including the creation of the pointed peak thereof, the creation of the back cut surfaces on the drill bit tips and the drill bit surfaces cannot be carried out by the just described known apparatus.

The apparatus of the present invention improves on the state of the art and relates to a multiple station tooling machine for finished production, in large numbers, of work pieces of the type having spiral grooves such as, for example, spiral threaded drill bits, whereby the multiple station tooling machine can carry out at various stations thereof different production steps such as grinding or cutting of the spiral grooves and grinding or cutting of the tips of the drill bits, as well as the placement and removal of the workpieces relative to the machine.

Prior art tooling machines operate principally with horizontally arranged workpieces. As such, these tooling machines have relatively large space requirements and the accessibility thereto to perform tool exchanges for tools such as grinding or cutting discs, workpiece engaging chucks, guide bushings, centering tips and the like is limited and time consuming.

SUMMARY OF THE INVENTION

The present invention provides a solution to the challenge of improving a multiple station tooling machine of the type for producing drill bits and other spirally grooved workpieces such that the machine can produce these items in an economical manner, has only relatively modest dimensions, and operates reliably. Moreover, all of the stations of the tooling should be readily accessible so that the downtime for work tool exchanges or for the changing out of auxiliary elements necessary for the particular tooling operation can be shortened to the greatest possible extent. Furthermore, the placement disposition of the workpiece during an exchange operation at a station of the tooling machine should remained unchanged.

In response to this challenge, the present invention provides a multiple station tooling machine for the production of spirally grooved products, the tooling machine having a base plate, a plurality of work stations distributed around the base plate and operable to effect selected tooling operations on work pieces, a support stand coupled to the base plate and supporting a support plate, and a turntable disposed above the support plate, the turntable being iteratively angularly movable. The multiple station tooling machine includes a plurality of workpiece retaining elements and an actuating assembly including drive means mounted on the support plate for moving the workpiece retaining elements to and between selected orientations. Additionally, the multiple station tooling machine includes a plurality of generally vertical shafts, each having a respective workpiece retaining element secured to one end thereof and the generally vertical shafts being arranged at angular spacings from one another around the turntable. Furthermore, the multiple station tooling machine includes means for releasably coupling the generally vertical shafts to the actuating assembly such that the actuating assembly can effect rotational and axial movement of the generally vertical shafts to thereby move the workpiece retaining elements secured to the generally vertical shafts into selected orientations. Also, the multiple station tooling machine includes means for releasably securing the generally vertical shafts to the turntable. The means for releasably securing the generally vertical shafts to the turntable is disposable in a securement disposition in which the generally vertical shafts are secured to the turntable for movement therewith while the turntable is iteratively angularly moved while the means for releasably coupling the generally vertical shafts to the actuating assembly is in an uncoupled disposition such that the generally vertical shafts and the actuating assembly are not coupled to one another and an unlocked disposition in which the generally vertical shafts are released from securement with the turntable to thereby be capable of rotational and axial movement as effected by the actuating assembly via the means for releasably coupling the generally vertical shafts to the actuating assembly.

The tooling machine of the present invention permits tooling operations in which the stations of the tooling machine can perform various tooling tasks such as, for example, the grinding or cutting of spiral grooves, the grinding or cutting of a tip of a workpiece including the sharpening back cut surfaces on the drill bit tips and surfaces and the placement of the workpiece into, and its removal from, the tooling machine.

As a result of the mounting of the drive means on the support plate of the tooling machine of the present invention, it is not necessary to move the drive means during an exchange operation at the stations of the tooling machine, whereby the coupling of the drive means with a CNC control and with an energy source is facilitated.

In order to prevent a change in the orientation of the workpiece retaining elements—that is, in order to prevent a turning of a workpiece retaining element or a change in its height during a tooling machine changeover operation— releasable couplings and releasable securing means are provided. The releasable securing means ensure that the workpiece retaining elements remain fixed in their orientations during the time that the releasable couplings are in their release disposition. Conversely, the releasable couplings are disposable in their coupling disposition when the releasable securing means are in their unlocked disposition, without engendering thereby a change in the orientation of the workpiece retaining elements.

The vertical arrangement of the workpiece retaining elements permits the uniform angular spacing arrangement of the stations about the base plate as well as the uniform angular spacing arrangement of the workpiece retaining elements about the turntable, with both the stations and the workpiece retaining elements being accessible from the exterior of the tooling machine such that the exchange of workpieces as well as tools and auxiliary elements needed for tooling operations is relatively convenient and can be accomplished in a time saving manner.

Moreover, the workpieces of the tooling machine of the present invention fall out of their retained dispositions due to gravity upon opening of the workpiece retaining elements without the need for springs or other ejectors.

The actuating assemblies of the tooling machine of the present invention can be supported on the turntable by means of movable supports such that the shafts having the workpiece retaining elements thereon are axial movable with respect to the pulleys of the actuating assemblies yet cannot rotate relative thereto.

Similarly, the actuating means of the tooling machine of the present invention can comprise shafts which are axially movably yet non-rotatably guided by the wheels of the drive means with movable coupling elements and releasable securing means being provided on the ends of the shafts.

Since each shaft having a workpiece retaining element secured thereto requires two actuating or drive assemblies, one for imparting rotative movement to the shaft and the other for imparting axial movement of the shaft, it is advisable that the drive assembly for imparting rotative movement be disposed under the turntable of the tooling machine of the present invention and the drive assembly for imparting axial movement be disposed above the turntable. Through this configuration, a space saving arrangement of the drive means is achievable as such means can be configured to comprise a toothed belt and pulley arrangement which operates with low noise production and reduced wear.

The shafts on which the movable coupling means as well as the releasably securing means are disposed, can preferably be coupled in a rotation permitting, axial movement preventing manner with a coupling of a hydraulic or pneumatic piston and cylinder device fixedly mounted to the turntable, as these shafts need only execute a simple translational movement in the axial direction.

The axial up and down movement of the shafts having workpiece retaining elements secured thereto can be effected by threaded spindles which operate in cooperation with threaded nuts fixedly secured to the shafts. In this manner, one end of each threaded spindle can be disposed on the turntable and the other end of each threaded spindle can be disposed on a non-rotating protective plate.

It is further possible to couple the threaded spindles and the shafts having workpiece retaining elements secured thereto to one another by means of bushing plates in which the shafts are retained.

In order to configure the tooling machine of the present invention with an automatic, CNC controlled opening and closing function for the workpiece retaining elements, hydraulic or pneumatic piston and cylinder units can be mounted to the free ends of those shafts having workpiece retaining elements secured thereto, these units being coupled with the workpiece retaining elements by rods which are supported on the shafts to thereby effect opening and closing of the workpiece retaining elements, whereby the units are rotatably mounted to the bushing plates.

If coaxial, freely movable weights are provided on the workpiece retaining elements, it is possible to ensure, in particular with small workpieces, that the workpieces do not remain stuck in the workpiece retaining elements upon the opening of the workpiece retaining elements but, rather, that these workpieces fall out of the workpiece retaining elements upon the impact thereagainst of the freely movable weights.

The coupling between the drive means and those components to be driven thereby is preferably configured as a toothed belt and pulley arrangement whereby one portion thereof is associated with the components to be driven and the other portion thereof is associated with the releasably securing means and can move therewith. Since the releasably securing means are only occasionally operated, these releasably securing means can be constructed in a simple manner with retaining pins receivable in holes formed in the turntable.

In order to supply with pressurized oil or pressurized air the hydraulic or pneumatic piston and cylinder arrangements which effectuate the locking and the opening and closing of the workpiece retaining elements and which move angularly along with the turntable, a rotatable manifold can be provided on the turntable with a fixed communication element sealingly coupled thereto for communicating the manifold with inlet and outlet conduits.

DETAILED DESCRIPTION OF THE PREFERRED EMBODIMENT

Figure 1:
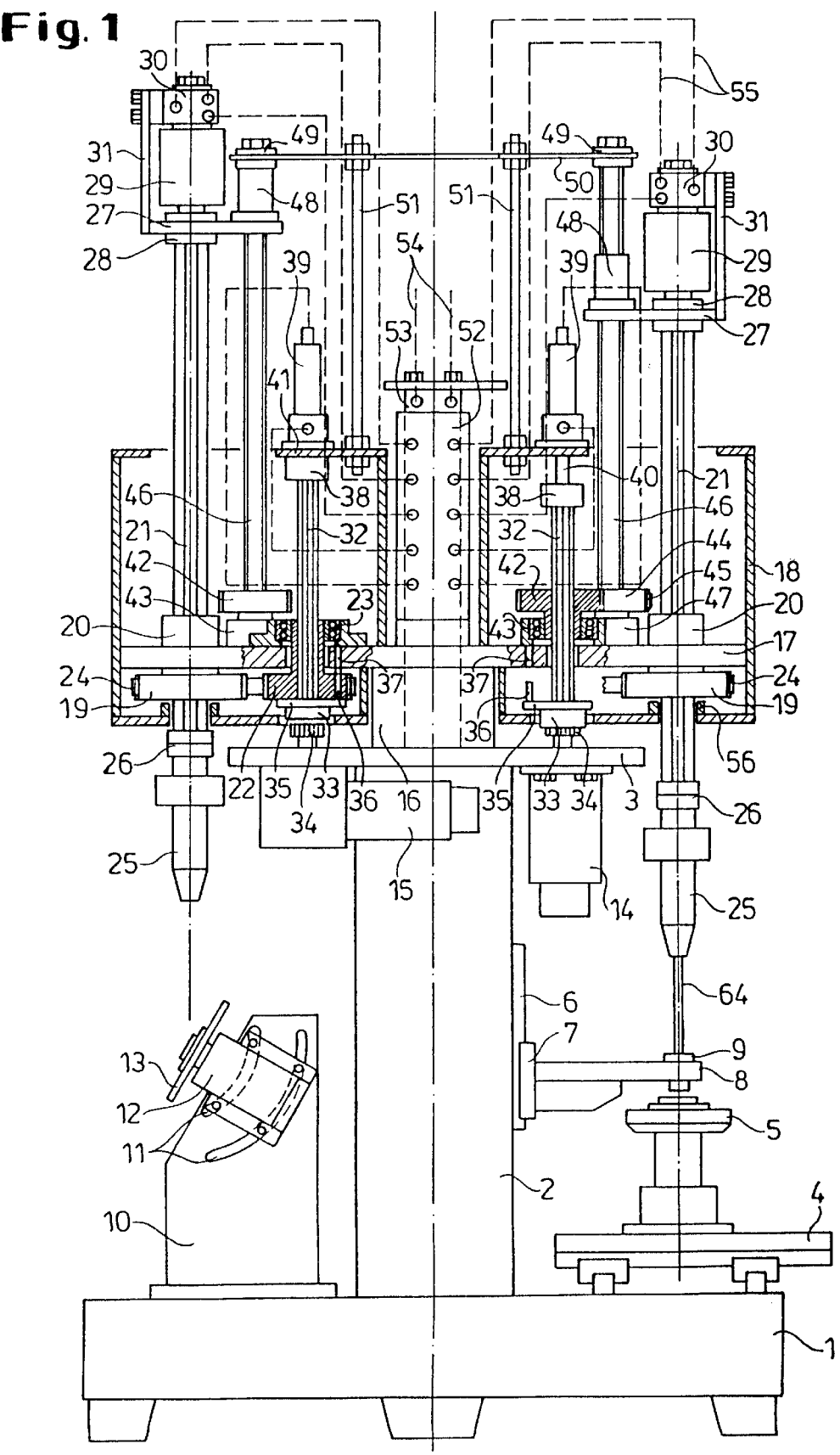
FIG. 1 is a schematic view, in partial section, of one exemplary embodiment of the tooling machine of the present invention.

A support stand 2 is mounted to the center of a base plate 1 and the support stand 2 supports, on its upper end, a horizontal support plate 3. Two stations of the tooling machine of the present invention are shown on the base plate 1. A cross sled 4 has thereon a grinding or cutting device 5 for grinding or cutting the tip of a drill bit. Guide rails 6 are mounted on the support stand 2 which serve to guide the sliding of slide shoes 7 therealong. The slide shoes 7 each have an arm 8 having a guide bushing 9 for a workpiece 64.

A holder 10 is disposed in counter-opposition to the other just described work station of the tooling machine of the present invention and the holder 10 includes arcuate guide slots 11 in which are guided a drive motor 12 for driving a grinding or cutting disc 13. The grinding or cutting disc 13 operates to grind or cut the spiral grooves in a spirally grooved drill bit and is adjustable in correspondence with the configuration of the spiral grooves to be formed.

A vertical servo motor 14 is disposed under the support plate 3 and a horizontal servo motor 15 having an angle drive is also disposed under the support plate 3.

A column 16 is rotatably mounted to the support stand 2 and a turntable 17 is fixedly mounted to the column. The turntable 17 is operable to move a plurality of workpiece retaining elements 25 into the regions of the individual stations of the tooling machine of the present invention and to dispose the stations for placement and removal of workpieces 64 thereat.

Each workpiece retaining element 25 is configured as a tension cartridge or chuck and is coupled via couplings 26 with a shaft 21 whereby the workpiece retaining element can rotate as well as be moved axially up and down.

A first actuating or drive assembly for effecting rotational and axial movement of an individual workpiece retaining element includes a toothed belt pulley 19 disposed in a housing 20 on the turntable 17 and another pulley 22 disposed in a housing 23 on the turntable 17, the pair of pulleys 19, 22 being coupled with one another via a toothed belt 24 trained therearound. This first drive device comprising the pulleys 19, 22 and the toothed belt 24 operates to rotate the shaft 21 and the workpiece retaining element secured thereto under the driving movement of the servo motor 15. The output shaft of the servo motor 15 is provided with a coupling head 34 having exterior teeth which operates in cooperation with a coupling head 33 having interior teeth. The coupling head 33 as well as a pin holder 35 are connected to a key slot actuating shaft 32 which is keyed to the pulley 22 in a manner in which the actuating shaft 32 rotates with the pulley 22 yet is axially movable with respect thereto. FIG. 1 shows the coupling in its out of engagement disposition in which the coupling head 33 has been displaced axial upwardly out of engagement with the coupling head 34. At the same time, the pin holder 35 with a pin 36 held therein has been displaced upwardly, whereby the pin 36 is received in a hole 37 in the turntable 17 and rotation of the toothed belt pulley 22 and, thus, the shaft 21 having the workpiece retaining element 25 secured thereto, is precluded.

In this out of engagement disposition, with all of the coupling heads 33, 34 being secured due to the receipt of their pins 36 in the holes 37 on the turntable, whereby all of the shafts 21 with the workpiece retaining elements secured thereto are secured, the turntable 17 is iteratively angularly movable, by means of a drive device (not shown) to move the workpieces 64 into other positions without the risk that the shafts 21 with their associated workpiece retaining elements 25 can rotate during this movement.

The upper end of each shaft 21 is guided by means of a bushing 28 supported on a bushing plate 27.

A hydraulic or pneumatic piston and cylinder unit 29 is mounted to the shaft 21 and is supplied with pressurized oil or air via a rotatable communication connector 30. The connector 30 is rotatable relative to the hydraulic or pneumatic piston and cylinder unit 29 and is non-rotatably mounted by a retaining element 31 to the bushing plate 27.

The key slot actuating shaft 32 is connected via a rotatable coupling 38 with the piston 40 of a hydraulic or pneumatic piston and cylinder unit 39, which is mounted to a transverse plate 41 of a housing 18 that encloses the turntable 17.

The actuating shaft 32 can, by operation of the hydraulic or pneumatic piston and cylinder unit 39, be disposed either in the uncoupled and secured disposition shown in the left hand side of FIG. 1 or in the coupled and unlocked disposition shown in the right hand side of FIG. 1.

A second actuating or drive assembly is provided to control the height setting of the shaft 21 having its associated workpiece retaining element 25 secured thereto. The second drive device comprises a toothed belt pulley 42 housed in a housing 43 on the turntable 17, a toothed belt pulley 44 secured to a threaded spindle 46, and a toothed belt 45 trained around the pulleys 42, 44. The threaded spindle 46 is rotatably mounted to the turntable 17 by means of a bushing 47 and to a support plate 50 by means of a bushing 49 which permits rotation of the threaded spindle while precluding axial movement thereof. The support plate 50 is connected via supports 51 with the transverse plate 41 of the housing 18.

The threaded spindle 46 cooperates with a ball race nut 48 which is mounted to the bushing plate 27. In connection with the driving movement of the threaded spindle 46 by means of the servo motor 14 acting through the toothed belt pulleys 42, 44 and the toothed belt 45, the ball race nut 48 is moved upwardly or downwardly in dependence upon the turning direction of the threaded spindle and this movement is translated to the shaft 21 via the bushing plate 27 such that the workpiece retaining element 25 is correspondingly raised or lowered.

While the left hand portion of FIG. 1 shows a secured disposition of the angular movement actuating assembly for the shaft 21 with the servo motor 15 uncoupled, the right hand portion of FIG. 1 shows a released disposition of the height setting actuating assembly for the shaft 21 with simultaneous coupling of the servo motor 14 with this actuating assembly.

The uncoupling and securing operation of the tooling machine of the present invention is performed in a manner such that the hydraulic or pneumatic piston and cylinder unit 39 is operated to effect movement of the shafts 32 into the upper position as shown in the left hand portion of FIG. 1 while the unlocked disposition and coupling operation of the tooling machine of the present invention, as shown in the right hand portion of FIG. 1, is effected by operation of the hydraulic or pneumatic piston and cylinder 39 to effect movement of the shafts 32 into the lower position.

To effect the respective extensions and retractions of the piston of the hydraulic or pneumatic piston and cylinder units 29, 39 by the supply to these units of pressurized oil or air, a manifold 52 is mounted to the turntable 17 and conduits 55 are connected from the manifold to the units 29, 39. A communication connector 53 is sealingly arranged in the manifold 52 and is mounted via the rotatable column 16 to the support stand 2. Inlet and outlet conduits 54 communicate with the communication connector 53 and the flow of pressurized oil or air therethrough is controlled by valves (not shown) in order to operate the hydraulic or pneumatic piston and cylinder units 29, 39 as desired. The inner configuration of the manifold is conventional and is not described in further detail herein.

Figure 2:
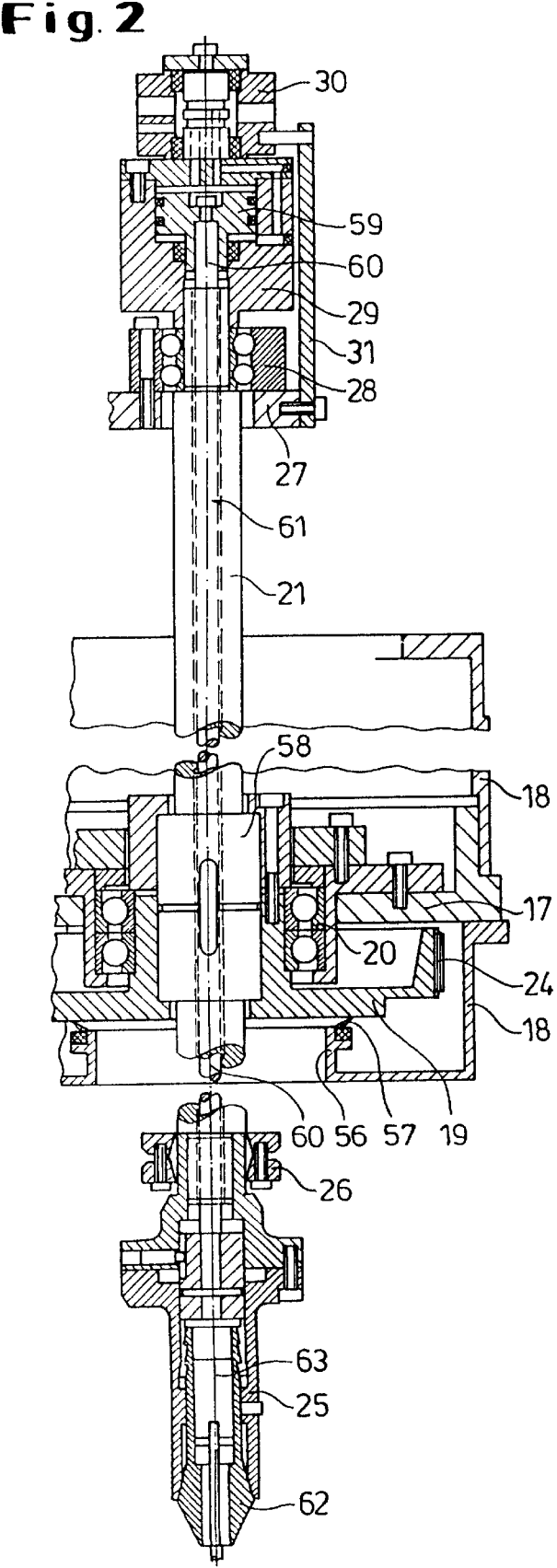
FIG. 2 is an enlarged sectional view of a shaft having a workpiece secured to one end thereof.

FIG. 2 illustrates further details of the operation of the workpiece retaining element 25 secured to the shaft 21. A neck element 56 is provided on the housing 18 in the vicinity of the shaft 21, the neck element having a thickened circumferential lip 57 on which the toothed belt pulley 19 is disposed.

A bushing key 58 is disposed in the core of the pulley 19 which serves to guide the corresponding threaded shaft portion of the shaft 21 to permit an axial displacement of the shaft 21 with respect to the pulley 19 while, at the same time, preventing rotation of the shaft 21 with respect to the pulley.

The shaft 21 has a coaxial bore 61 in which a rod 60 cooperating with a piston 59 of the piston and cylinder unit 29 is arranged, the rod 60 extending the entire length of the shaft 21 into the region of the workpiece retaining element 25. The rod 60 is coupled to the workpiece retaining element 25 via a chuck 62. In connection with an upward movement of the piston 59, the chuck 62 of the workpiece retaining element 25 is drawn into the workpiece retaining element to thereby effect clamping retention of a workpiece 64.

A freely movable weight 63 is arranged within the chuck 62 which moves initially upwardly in connection with upward movement of the chuck 62 and subsequently moves downwardly under the action of gravity. In the event that a workpiece 64 remains in the workpiece retaining element 25 during the opened disposition of the chuck 62, an impact of the downwardly falling weight 63 on the end of the workpiece and an impact on the chuck 62 will reliably effect dropping of the workpiece 64 from the workpiece retaining element 25.

The specification incorporates by reference the disclosure of German priority document 199 26 668.9 of Jun. 11, 1999.

The present invention is, of course, in no way restricted to the specific disclosure of the specification and drawings, but also encompasses any modifications within the scope of the appended claims.

What is claimed is:

1. A multiple station tooling machine for the production of spirally grooved products, the tooling machine having a base plate, a plurality of work stations distributed around the base plate and operable to effect selected tooling operations on work pieces, a support stand coupled to the base plate and supporting a support plate, and a turntable disposed above the support plate, the turntable being iteratively angularly movable, the multiple station tooling machine comprising:
   a plurality of workpiece retaining elements;
   an actuating assembly including drive means mounted on the support plate for moving the workpiece retaining elements to and between selected orientations;
   a plurality of generally vertical shafts, each having a respective workpiece retaining element secured to one end thereof and the generally vertical shafts being arranged at angular spacings from one another around the turntable;
   means for releasably coupling the generally vertical shafts to the actuating assembly such that the actuating assembly can effect rotational and axial movement of the generally vertical shafts to thereby move the workpiece retaining elements secured to the generally vertical shafts into selected orientations; and
   means for releasably securing the generally vertical shafts to the turntable, the means for releasably securing the generally vertical shafts to the turntable being disposable in a securement disposition in which the generally vertical shafts are secured to the turntable for movement therewith while the turntable is iteratively angularly moved while the means for releasably coupling the generally vertical shafts to the actuating assembly is in an uncoupled disposition such that the generally vertical shafts and the actuating assembly are not coupled to one another and the means for releasably securing the generally vertical shafts to the turntable being disposable in an unlocked disposition in which the generally vertical shafts are released from securement with the turntable to thereby be capable of rotational and axial movement as effected by the actuating assembly via the means for releasably coupling the generally vertical shafts to the actuating assembly.

2. The multiple station tooling machine according to claim 1, wherein the means for releasably coupling the generally vertical shafts to the drive means includes an actuating shaft associated with each generally vertical shaft, a belt and pulley arrangement for interconnecting each actuating shaft with the drive means in a manner in which the actuating shaft can be coupled for rotational movement with the drive means yet be axially movable relative to the drive means.

3. The multiple station tooling machine according to claim 2, wherein the drive means includes a motor mounted below the turntable for supplying motive power for rotation of the generally vertical shafts via coupling thereof with the actuating shafts and a motor mounted above the turntable for supplying motive power for axial movement of the generally vertical shafts via coupling thereof with the actuating shafts.

4. The multiple station tooling machine according to claim 3, wherein each belt and pulley arrangement includes a toothed belt and a pair of toothed pulleys.

5. The multiple station tooling machine according to claim 4, and further comprising a plurality of piston and cylinder assemblies each connected with a respective workpiece retaining element and means for coupling each actuating shaft with a respective piston and cylinder assembly in a mannerwhich permits rotational movement of the actuating shaft yet precludes axial movement of the actuating shaft relative to the respective piston and cylinder assembly.

6. The multiple station tooling machine according to claim 2, wherein each actuating shaft includes a key slot, and a pulley of the associated belt and pulley arrangement includes a key element for engaging the key slot of the actuating shaft.

7. The multiple station tooling machine according to claim 2, wherein each generally vertical shaft has a threaded spindle associated therewith and a ball race nut for receiving the threaded spindle therein and fixedly connected to the generally vertical shaft and the drive means is operable to rotate the threaded spindles to effect axial movement of the generally vertical shafts.

8. The multiple station tooling machine according to claim 7, wherein each threaded spindle has one end rotatably mounted to the turntable and its other end mounted to a support plate.

9. The multiple station tooling machine according to claim 7, wherein each ball race nut is mounted to a bushing plate which includes a bushing receiving therein the respective generally vertical shaft.

10. The multiple station tooling machine according to claim 5, wherein each piston and cylinder assembly includes a rod interconnecting the piston and cylinder assembly with the workpiece retaining element secured to the respective generally vertical shaft for effecting opening and closing of the workpiece retaining element to thereby retain or release a workpiece.

11. The multiple station tooling machine according to claim 1, and further comprising a freely movable weight associated with each respective workpiece retaining element, each freely movable weight being downwardly movable under the influence of gravity to thereby exert a force which facilitates the release of a workpiece retained by the workpiece retaining element.

12. The multiple station tooling machine according to claim 1, wherein the means for releasably securing the generally vertical shafts to the turntable includes a plurality of rotation stop members each having one portion for engaging the turntable and another portion for engaging the motor for supplying motive power for axial movement.

13. The multiple station tooling machine according to claim 12, wherein the one portion of each rotation stop member is configured as a pin receivable in a corresponding bore in the turntable.

14. The multiple station tooling machine according to claim 1, and further comprising a manifold for supplying pressurization fluid to the piston and cylinder assemblies and a communication connector fixedly connected to the support stand for interconnecting the manifold with inlet and outlet conduits communicated with the pressurization fluid source.

15. The multiple station tooling machine according to claim 4, wherein the motors are CNC controlled servomotors.

* * * * *